United States Patent
Kim et al.

(10) Patent No.: US 11,929,497 B2
(45) Date of Patent: Mar. 12, 2024

(54) NEGATIVE ELECTRODE ACTIVE MATERIAL, NEGATIVE ELECTRODE INCLUDING THE NEGATIVE ELECTRODE ACTIVE MATERIAL, SECONDARY BATTERY INCLUDING THE NEGATIVE ELECTRODE, AND METHOD OF PREPARING THE NEGATIVE ELECTRODE ACTIVE MATERIAL

(71) Applicant: LG CHEM, LTD., Seoul (KR)

(72) Inventors: Dong Hyuk Kim, Daejeon (KR); Eun Kyung Kim, Daejeon (KR); Yong Ju Lee, Daejeon (KR); Rae Hwan Jo, Daejeon (KR); Jung Hyun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 341 days.

(21) Appl. No.: 16/671,487

(22) Filed: Nov. 1, 2019

(65) Prior Publication Data

US 2020/0067088 A1    Feb. 27, 2020

Related U.S. Application Data

(63) Continuation of application No. PCT/KR2018/005228, filed on May 4, 2018.

(30) Foreign Application Priority Data

May 4, 2017  (KR) .................... 10-2017-0057050
May 4, 2018  (KR) .................... 10-2018-0051920

(51) Int. Cl.
*H01M 4/583* (2010.01)
*H01M 4/131* (2010.01)
(Continued)

(52) U.S. Cl.
CPC ........... *H01M 4/386* (2013.01); *H01M 4/131* (2013.01); *H01M 4/134* (2013.01);
(Continued)

(58) Field of Classification Search
CPC ...... H01M 4/386; H01M 4/131; H01M 4/134; H01M 4/1395; H01M 4/485; H01M 4/587;
(Continued)

(56) References Cited

U.S. PATENT DOCUMENTS

2007/0122707 A1    5/2007   Kwon et al.
2008/0166474 A1    7/2008   Deguchi et al.
(Continued)

FOREIGN PATENT DOCUMENTS

CN    106463716 A    2/2017
EP    2579365 A1     4/2013
(Continued)

OTHER PUBLICATIONS

Extended European Search Report, dated Apr. 8, 2020, for European Application No. 18795093.6.
(Continued)

*Primary Examiner* — Cynthia K Walls
(74) *Attorney, Agent, or Firm* — Birch, Stewart, Kolasch & Birch, LLP

(57) ABSTRACT

A negative electrode active material as well as a method of preparing a negative electrode active material which includes preparing a silicon-based compound including $SiO_x$, wherein $0.5<x<1.3$; disposing a polymer layer including a polymer compound on the silicon-based compound; disposing a metal catalyst layer on the polymer layer; heat treating the silicon-based compound on which the polymer layer and the metal catalyst layer are disposed; and removing the metal catalyst layer, wherein the polymer compound
(Continued)

includes any one selected from the group consisting of glucose, fructose, galactose, maltose, lactose, sucrose, a phenolic resin, a naphthalene resin, a polyvinyl alcohol resin, a urethane resin, polyimide, a furan resin, a cellulose resin, an epoxy resin, a polystyrene resin, a resorcinol-based resin, a phloroglucinol-based resin, a coal-derived pitch, a petroleum-derived pitch, a tar and a mixture of two or more thereof.

9 Claims, 2 Drawing Sheets

(51) Int. Cl.
| | | |
|---|---|---|
| H01M 4/134 | (2010.01) | |
| H01M 4/1395 | (2010.01) | |
| H01M 4/38 | (2006.01) | |
| H01M 4/485 | (2010.01) | |
| H01M 4/587 | (2010.01) | |
| H01M 4/62 | (2006.01) | |
| H01M 10/052 | (2010.01) | |
| H01M 4/02 | (2006.01) | |

(52) U.S. Cl.
CPC ......... *H01M 4/1395* (2013.01); *H01M 4/485* (2013.01); *H01M 4/587* (2013.01); *H01M 4/625* (2013.01); *H01M 10/052* (2013.01); H01M 2004/027 (2013.01); H01M 2004/028 (2013.01)

(58) Field of Classification Search
CPC ............... H01M 4/625; H01M 10/052; H01M 2004/027; H01M 2004/028; H01M 4/136; H01M 4/1397; H01M 2004/021; H01M 4/1391; H01M 4/366; H01M 4/483; H01M 4/58; H01M 4/583; H01M 4/624; H01M 10/0525; H01M 4/62; Y02E 60/10; Y02P 70/50
See application file for complete search history.

(56) References Cited

U.S. PATENT DOCUMENTS

| | | |
|---|---|---|
| 2010/0196759 A1 | 8/2010 | Nakane et al. |
| 2012/0021250 A1 | 1/2012 | Lee et al. |
| 2013/0004846 A1 | 1/2013 | Kim et al. |
| 2013/0089784 A1 | 4/2013 | Cho et al. |
| 2013/0309571 A1 | 11/2013 | Yoon et al. |
| 2014/0363741 A1 | 12/2014 | Lee et al. |
| 2015/0280223 A1 | 10/2015 | Chang et al. |
| 2016/0015652 A1 | 1/2016 | John et al. |
| 2016/0043384 A1* | 2/2016 | Zhamu .................. H01M 4/366 429/231.4 |
| 2016/0211511 A1 | 7/2016 | Ren et al. |
| 2016/0365573 A1 | 12/2016 | Li et al. |
| 2017/0047584 A1 | 2/2017 | Hwang et al. |
| 2017/0149050 A1 | 5/2017 | Hirose et al. |
| 2017/0194638 A1 | 7/2017 | Cho et al. |
| 2018/0226648 A1 | 8/2018 | Takahashi et al. |
| 2018/0287142 A1* | 10/2018 | Zhamu .................. H01M 4/386 |
| 2019/0157682 A1* | 5/2019 | Ho ....................... H01M 4/1395 |

FOREIGN PATENT DOCUMENTS

| | | |
|---|---|---|
| JP | 2009-514164 A | 4/2009 |
| JP | 2012-25653 A | 2/2012 |
| JP | 2015-502025 A | 1/2015 |
| JP | 2015-512130 A | 4/2015 |
| JP | 2017-4895 A | 1/2017 |
| KR | 10-2010-0014993 A | 2/2010 |
| KR | 10-2010-0043060 A | 4/2010 |
| KR | 10-1042009 B1 | 6/2011 |
| KR | 10-2014-0072663 A | 6/2014 |
| KR | 10-2015-0128592 A | 11/2015 |
| KR | 10-2015-0141154 A | 12/2015 |
| KR | 10-2016-0001481 A | 1/2016 |
| KR | 10-2016-0089858 A | 7/2016 |
| KR | 10-2016-0103272 A | 9/2016 |
| KR | 10-2016-0149862 A | 12/2016 |

OTHER PUBLICATIONS

International Search Report for PCT/KR2018/005228 dated Aug. 24, 2018.

* cited by examiner

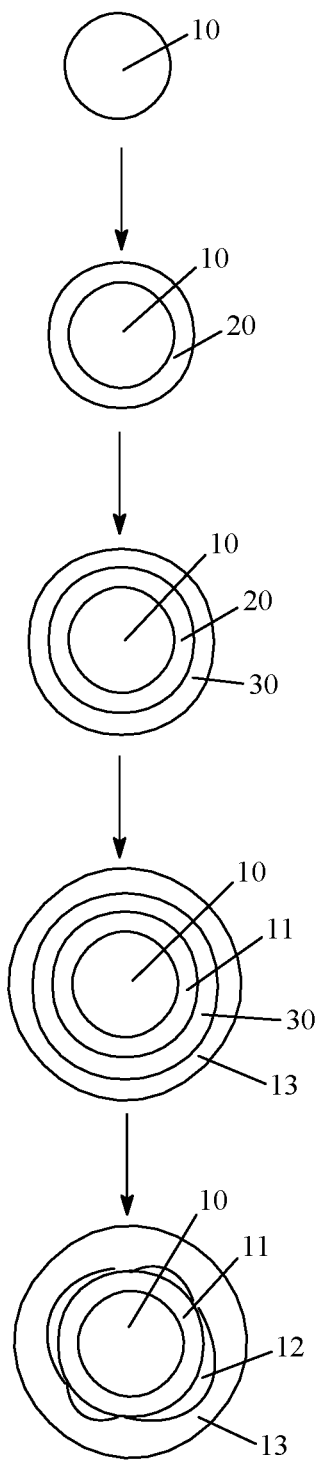

NEGATIVE ELECTRODE ACTIVE MATERIAL, NEGATIVE ELECTRODE INCLUDING THE NEGATIVE ELECTRODE ACTIVE MATERIAL, SECONDARY BATTERY INCLUDING THE NEGATIVE ELECTRODE, AND METHOD OF PREPARING THE NEGATIVE ELECTRODE ACTIVE MATERIAL

CROSS-REFERENCE TO RELATED APPLICATIONS

This application is a By-Pass Continuation of International Application PCT/KR2018/005228, filed May 4, 2018, which claims the benefit of Korean Patent Application Nos. 10-2017-0057050, filed on May 4, 2017, and 10-2018-0051920, filed on May 4, 2018, in the Korean Intellectual Property Office, the disclosures of which are incorporated herein in their entirety by reference.

TECHNICAL FIELD

The present invention relates to a negative electrode active material, a negative electrode including the negative electrode active material, a secondary battery including the negative electrode, and a method of preparing the negative electrode active material, and specifically, the method of preparing the negative electrode active material includes preparing a silicon-based compound (i.e., silicon containing compound) including $SiO_x$ (0.5<x<1.3); disposing a polymer layer including a polymer compound on the silicon-based compound; disposing a metal catalyst layer on the polymer layer; and heat treating the silicon-based compound on which the polymer layer and the metal catalyst layer are disposed.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery includes a positive electrode, a negative electrode, an electrolyte, and a separator. The negative electrode includes a negative electrode active material in which lithium ions from the positive electrode are intercalated and deintercalated, and a silicon-based active material having high discharge capacity may be used as the negative electrode active material. However, since excessive contraction and expansion of the silicon-based active material occur during charge and discharge of the battery, a conductive path in the active material is blocked, and thus, cycle characteristics of the battery are reduced.

In order to address this limitation, a carbon coating layer was typically formed on a surface of a silicon-based active material (see Korean Patent Application Laid-open Publication No. 10-2016-0149862). Furthermore, there have been attempts to further improve conductivity by allowing the carbon coating layer to include graphene. In order to dispose graphene on the surface of the silicon-based active material, chemical vapor deposition (CVD) has mainly been used, but, since a separate hydrocarbon source must be used, this process may not be simplified.

Thus, there is a need to develop a simplified process which may dispose a carbon coating layer including graphene on the surface of the silicon-based active material.

PRIOR ART DOCUMENT

[Patent Document]
Korean Patent Application Laid-open Publication No. 10-2016-0149862.

DISCLOSURE OF THE INVENTION

Technical Problem

An aspect of the present invention provides a method of preparing a negative electrode active material in which a process of forming a carbon coating layer including graphene on a surface of a silicon-based active material may be simplified.

Another aspect of the present invention provides a negative electrode active material, a negative electrode, and a secondary battery in which, for example, an excessive change in volume of the negative electrode active material during charge and discharge of the battery may be controlled.

Technical Solution

According to an aspect of the present invention, there is provided a method of preparing a negative electrode active material which includes: preparing a silicon-based compound including $SiO_x$, wherein 0.5<x<1.3; disposing a polymer layer including a polymer compound on the silicon-based compound; disposing a metal catalyst layer on the polymer layer; heat treating the silicon-based compound on which the polymer layer and the metal catalyst layer are disposed; and removing the metal catalyst layer, wherein the polymer compound includes any one selected from the group consisting of glucose, fructose, galactose, maltose, lactose, sucrose, a phenolic resin, a naphthalene resin, a polyvinyl alcohol resin, a urethane resin, polyimide, a furan resin, a cellulose resin, an epoxy resin, a polystyrene resin, a resorcinol-based resin, a phloroglucinol-based resin, a coal-derived pitch, a petroleum-derived pitch, a tar and a mixture of two or more thereof.

According to another aspect of the present invention, there is provided a secondary battery which includes a negative electrode active material including a silicon-based compound including $SiO_x$, wherein 0.5<x<1.3; an amorphous carbon layer disposed on the silicon-based compound; a graphene layer disposed on the amorphous carbon layer; and at least one cavity present on at least a portion of a surface of the amorphous carbon layer and positioned between the amorphous carbon layer and the graphene layer, and a negative electrode including the negative electrode active material.

Advantageous Effects

A method of preparing a negative electrode active material according to an embodiment of the present invention does not require a separate chemical vapor deposition (CVD) process which supplies a carbon raw material during the preparation of a graphene layer. Also, since an amorphous carbon layer and a graphene layer may be formed while a polymer layer and a metal catalyst layer are heat-treated, a process may be simplified.

According to a negative electrode active material according to another embodiment of the present invention, internal stress during charge and discharge of a battery may be relieved by the presence of at least one cavity in the negative electrode active material. Accordingly, since structural collapse of a negative electrode may be suppressed and a conductive path in the negative electrode active material may be maintained, cycle characteristics of the battery may be improved.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

FIG. 3 is an illustration of a method of preparing a negative electrode active material according to an embodiment of the present invention.

MODE FOR CARRYING OUT THE INVENTION

Figure 1:
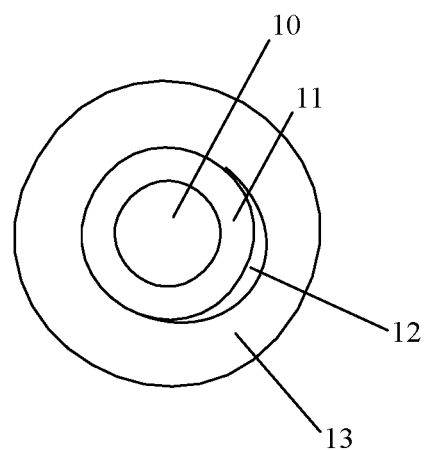
FIG. 1 is an illustration of a negative electrode active material according to an embodiment of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, a thickness of an amorphous carbon layer, graphene layer, polymer layer, or metal catalyst layer may be measured with a transmission electron microscope (TEM).

A method of preparing a negative electrode active material according to an embodiment of the present invention includes: preparing a silicon-based compound including $SiO_x$, wherein $0.5<x<1.3$; disposing a polymer layer including a polymer compound on the silicon-based compound; disposing a metal catalyst layer on the polymer layer; heat treating the silicon-based compound on which the polymer layer and the metal catalyst layer are disposed; and removing the metal catalyst layer, wherein the polymer compound may include any one selected from the group consisting of glucose, fructose, galactose, maltose, lactose, sucrose, a phenolic resin, a naphthalene resin, a polyvinyl alcohol resin, a urethane resin, polyimide, a furan resin, a cellulose resin, an epoxy resin, a polystyrene resin, a resorcinol-based resin, a phloroglucinol-based resin, a coal-derived pitch, a petroleum-derived pitch, a tar and a mixture of two or more thereof.

Referring to FIG. 3, an embodiment of a method of preparing a negative electrode active material of the present invention includes preparing a silicon-based compound (10) comprising $SiO_x$, wherein $0.5<x<1.3$; disposing a polymer layer (20) including a polymer compound on the silicon-based compound (10); disposing a metal catalyst layer (30) on the polymer layer (20); heat treating the silicon-based compound (10) on which the polymer layer (20) and the metal catalyst layer (30) are disposed; and removing the metal catalyst layer. The heat treating step carbonizes the polymer layer into an amorphous carbon layer (11) formed on the silicon-based compound (10), and simultaneously generates a carbon source from the polymer layer, which carbon source is supplied to the metal catalyst layer, thereby forming a graphene layer (13). The removing of the metal catalyst layer forms at least one cavity (12) between the amorphous carbon layer (11) and the graphene layer (13).

The silicon-based compound may include $SiO_x$ ($0.5<x<1.3$). The preparing of the silicon-based compound may include a reaction of $SiO_{x1}$ (wherein $0<x1<2$) with a metal. The $SiO_{x1}$ ($0<x1<2$) may be in the form in which silicon (Si) and $SiO_2$ are included. That is, x and x1 correspond to ratios of the number of oxygen (O) atoms to Si atoms included in the $SiO_x$ ($0.5<x<1.3$) or $SiO_{x1}$ ($0<x1<2$), respectively.

The silicon-based compound may further include a metal silicate. Specifically, the metal silicate may be doped into the $SiO_x$ ($0.5<x<1.3$) through a reaction of the $SiO_{x1}$ ($0<x1<2$) with the metal. The metal silicate may be disposed in the silicon-based compound.

The metal silicate may exist in a state in which it is doped into the $SiO_x$ ($0.5<x<1.3$). The metal silicate may include at least one selected from the group consisting of $Li_2Si_2O_5$, $Li_3SiO_3$, $Li_4SiO_4$, $Mg_2SiO_4$, $MgSiO_3$, $Ca_2SiO_4$, $CaSiO_3$, and $TiSiO_4$.

Metal of the metal silicate may be included in an amount of 1 part by weight to 30 parts by weight, for example, 2 parts by weight to 20 parts by weight based on 100 parts by weight of the $SiO_x$ ($0.5<x<1.3$). In a case in which the amount of the metal satisfies the above range of 1 part by weight to 30 parts by weight, the growth of Si grains may be suppressed and initial efficiency may be improved.

The reaction of the $SiO_{x1}$ ($0<x1<2$) with the metal may include a reaction of the $SiO_{x1}$ ($0<x1<2$) with metal powder or metallic gas including the metal.

The metal may include at least one selected from the group consisting of lithium (Li), magnesium (Mg), titanium (Ti), and calcium (Ca), and may specifically include Li and Mg. The reaction between the $SiO_{x1}$ and the metal may be performed in a temperature range of 300° C. to 1,000° C. for 1 hour to 24 hours.

The reaction between the $SiO_{x1}$ and the metal may be performed in the presence of (e.g., under a flow of) an inert gas. The inert gas may include at least one selected from the group consisting of argon (Ar), nitrogen ($N_2$), neon (Ne), helium (He), and krypton (Kr).

The preparing of the silicon-based compound may further include removing a portion of the metal silicate generated during the reaction with the metal. Specifically, the preparing of the silicon-based compound may include removing the metal silicate disposed on the surface of the silicon-based compound among the metal silicate generated during the reaction with the metal. The metal silicate may be removed by using an HCl aqueous solution.

An average particle diameter ($D_{50}$) of the silicon-based compound may be in a range of 0.1 μm to 20 μm, for example, 0.5 μm to 10 μm. In a case in which the average particle diameter of the silicon-based compound satisfies the above range of 0.1 μm to 20 μm, rate capability of a battery may be improved.

The disposing of the polymer layer including a polymer compound on the silicon-based compound may include a general method, although it is not necessarily limited thereto. For example, the polymer layer may be formed by coating the silicon-based compound with the polymer compound itself and then performing thermal curing, or by coating the silicon-based compound with a carbon-containing material and then performing a heat treatment. Specifically, for example, in a case in which the polymer layer includes polyimide, the polymer layer may be formed by coating the silicon-based compound with poly(acrylic acid) (PAA) and then performing a heat treatment.

The polymer compound may include any one selected from the group consisting of glucose, fructose, galactose, maltose, lactose, sucrose, a phenolic resin, a naphthalene resin, a polyvinyl alcohol resin, a urethane resin, polyimide, a furan resin, a cellulose resin, an epoxy resin, a polystyrene resin, a resorcinol-based resin, a phloroglucinol-based resin, a coal-derived pitch, a petroleum-derived pitch, a tar and a mixture of two or more thereof, and may specifically include polyimide.

The polymer layer may have a thickness of 0.001 μm to 10 μm, for example, 0.01 μm to 5 μm. In a case in which the above thickness range of 0.001 μm to 10 μm is satisfied, since a sufficient carbon source may be supplied, a graphene layer may be continuously and uniformly formed.

The disposing of the metal catalyst layer on the polymer layer may include the following method, although it is not necessarily limited thereto.

After the silicon-based compound having the polymer layer disposed thereon is added to a solution including a metal salt, a metal catalyst layer may be disposed on the polymer layer by using an electroless plating method in which a reducing agent is added and stirred.

The metal catalyst layer may include at least one metal selected from the group consisting of nickel (Ni), copper (Cu), iron (Fe), and cobalt (Co), and may specifically include Ni.

The metal catalyst layer may have a thickness of 0.001 μm to 10 μm, for example, 0.01 μm to 5 μm. In a case in which the above thickness range of 0.001 μm to 10 μm is satisfied, a highly crystalline graphene layer may be continuously and uniformly formed.

In the disposing of the metal catalyst layer on the polymer layer, a weight ratio of the polymer layer to the metal catalyst layer may be in a range of 1:1 to 20:1, for example, 2:1 to 10:1. In a case in which the above weight ratio range of 1:1 to 20:1 is satisfied, a graphene layer may be continuously and uniformly formed.

The polymer layer may be carbonized through the heat treating of the silicon-based compound on which the polymer layer and the metal catalyst layer are disposed. Accordingly, an amorphous carbon layer may be formed on the silicon-based compound. Simultaneously, since a carbon source generated from the polymer layer may be supplied to the metal catalyst layer, a graphene layer may be formed. The heat treatment may be performed in a temperature range of 300° C. to 1,000° C., for example, 450° C. to 900° C. In a case in which the above heat treatment temperature range of 300° C. to 1,000° C. is satisfied, a highly crystalline graphene layer may be formed while suppressing the growth of the silicon grains. The heat treatment may be performed for 0.5 minutes to 1 hour.

The removing of the metal catalyst layer may include the following method, although it is not necessarily limited thereto.

After the silicon-based compound having the metal catalyst layer disposed thereon is added to an acidic solution, the metal catalyst layer may be removed by etching for a predetermined time and drying. By way of a non-limiting example, the acid solution may be $FeCl_3$, with a drying time of about 8 hours and a drying temperature of about 130° C.

At least one cavity, which corresponds to a separated space between the amorphous carbon layer and the graphene layer, may be formed by the removing of the metal catalyst layer. Stated differently, upon removal of the metal catalyst layer, at least one cavity is formed between the amorphous carbon layer and the graphene layer. Accordingly, since an excessive change in volume of the negative electrode active material may be prevented during charge and discharge of the battery, a conductive path in the negative electrode active material may be secured, and thus, cycle characteristics may be improved.

A negative electrode active material according to another embodiment of the present invention may include a silicon-based compound including $SiO_x$, wherein $0.5<x<1.3$; an amorphous carbon layer disposed on the silicon-based compound; a graphene layer disposed on the amorphous carbon layer; and at least one cavity present on at least a portion of a surface of the amorphous carbon layer and positioned between the amorphous carbon layer and the graphene layer. Herein, the silicon-based compound including $SiO_x$ ($0.5<x<1.3$) is the same as described above.

The amorphous carbon layer may be disposed on the silicon-based compound. The amorphous carbon layer may include amorphous carbon and may specifically be formed of amorphous carbon. The rate capability of the battery may be improved by the amorphous carbon layer.

The amorphous carbon layer may have a thickness of 0.001 μm to 10 μm, for example, 0.01 μm to 5 μm. In a case in which the above thickness range of 0.001 μm to 10 μm is satisfied, a battery having excellent rate capability may be prepared without a reduction in the initial efficiency.

The graphene layer may be disposed on the amorphous carbon layer. The graphene layer may include graphene and may specifically be formed of graphene. In the present invention, the expression "graphene" denotes a carbonaceous structure which, for example, has a thickness of 0.2 μm (e.g., 200 nm) or less, includes carbon atoms constituting a hexagonal lattice, has flexibility, and is in the form of a thin film. Since volume expansion of the silicon-based compound during charge and discharge may be controlled by the graphene layer, the cycle characteristics of the battery may be improved by preventing the blockage of the conductive path.

The graphene layer may have a thickness of 0.5 nm to 200 nm, for example, 1 nm to 100 nm. In a case in which the above thickness range of 0.5 nm to 200 nm is satisfied, the cycle characteristic of the battery may be improved.

The amorphous carbon layer and the graphene layer may be formed by carbonization of the above-described polymer layer.

The at least one cavity (e.g., cavity layer) may be disposed between the amorphous carbon layer and the graphene layer. Specifically, the at least one cavity corresponds to at least one separated space between the amorphous carbon layer and the graphene layer. The at least one cavity may include a single separated space or two or more separated spaces. That is, the at least one cavity may be present on at least a portion of a surface of the amorphous carbon layer, and, in a case in which the at least one includes two or more separated spaces, these spaces may be present and scattered on the surface of the amorphous carbon layer. The at least one cavity is not formed only by the removal of the metal catalyst layer. Specifically, since the above-described polymer layer is shrunk while being carbonized (pyrolyzed) by the heat treatment, the at least one cavity may be realized. That is, since the heat treatment is performed after the polymer layer and the metal catalyst layer are sequentially disposed according to the preparation method of the present invention, the at least one cavity may be formed. Since the at least one cavity may play a role in relieving internal stress due to the change in volume of the silicon-based compound during charge and discharge of the battery, the conductive path of the negative electrode active material may be maintained.

The at least one cavity may have an average thickness of 0.5 nm to 200 nm, for example, 100 nm to 200 nm. In a case in which the above thickness 0.5 nm to 200 nm is satisfied, since a sufficient area capable of relieving the internal stress due to the change in volume of the silicon-based compound during charge and discharge of the battery may be secured, the conductive path of the negative electrode active material may be more smoothly maintained.

Figure 2:
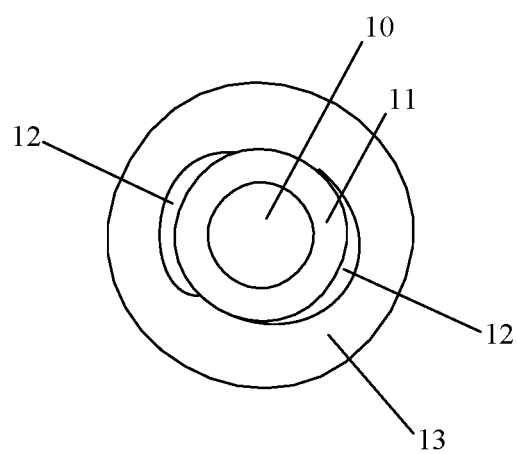
FIG. 2 is an illustration of a negative electrode active material according to an embodiment of the present invention.

Referring to FIG. 1, an embodiment of the negative electrode active material of the present invention includes a silicon-based compound (10) including $SiO_x$, wherein $0.5<x<1.3$; an amorphous carbon layer (11) disposed on the silicon-based compound (10); a graphene layer (13) disposed on the amorphous carbon layer; and at least one cavity (12) present on at least a portion of a surface of the amorphous carbon layer (11) and positioned between the amorphous carbon layer (11) and the graphene layer (13). As shown in FIG. 2, there may be more than one cavity (12) present on at least a portion of a surface of the amorphous carbon layer (11) and positioned between the amorphous carbon layer (11) and the graphene layer (13).

A negative electrode according to another embodiment of the present invention may include a negative electrode active material, and, herein, the negative electrode active material may be the same as the above-described negative electrode active material. Specifically, the negative electrode may include a current collector and a negative electrode active material layer disposed on the current collector. The negative electrode active material layer may include the negative electrode active material. Furthermore, the negative electrode active material layer may further include a binder and/or a conductive agent. Also, the negative electrode may further include graphite-based particles, and the graphite-based particles may be included in the negative electrode active material layer.

The binder may include at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, polyacrylic acid, and polymers in which hydrogen thereof is substituted with Li, sodium (Na), or Ca, and may also include various copolymers thereof.

The conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The graphite-based active material particles may include at least one selected from the group consisting of artificial graphite, natural graphite, graphitized carbon fibers, and graphitized mesocarbon microbeads. Charge and discharge characteristics of the battery may be improved by using the graphite-based active material particles with secondary particles.

A secondary battery according to another embodiment of the present invention may include a negative electrode, a positive electrode, a separator disposed between the positive electrode and the negative electrode, and an electrolyte, and the negative electrode may be the same as described above.

The positive electrode may include a positive electrode active material. The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium manganese oxides, such as $Li_{1+y1}Mn_{2-y1}O_4(0 \leq y1 \leq 0.33)$, $LiMnO_3$, $LiMn_2O_3$, and $LiMnO_2$; lithium copper oxide ($Li_2CuO_2$); vanadium oxides, such as $LiV_3O_8$, $V_2O_5$, and $Cu_2V_2O_7$; nickel (Ni)-site type lithium nickel oxide expressed by a chemical formula of $LiNi_{1-y2}M_{y2}O_2$ (where M is cobalt (Co), manganese (Mn), aluminum (Al), copper (Cu), iron (Fe), magnesium (Mg), boron (B), or gallium (Ga), and y2 satisfies $0.01 \leq y2 \leq 0.3$); lithium manganese complex oxide expressed by a chemical formula of $LiMn_{2-y3}M_{y3}O_2$ (where M is Co, Ni, Fe, chromium (Cr), zinc (Zn), or tantalum (Ta), and y3 satisfies $0.01 \leq y3 \leq 0.1$) or $Li_2Mn_3MO_8$ (where M is Fe, Co, Ni, Cu, or Zn); and $LiMn_2O_4$ having a part of Li being substituted with alkaline earth metal ions, but the positive electrode active material is not limited thereto. The positive electrode may be Li-metal.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, a ring-type carbonate may be preferably used. Since an electrolyte solution having high electrical conductivity may be prepared when a ring-type carbonate is mixed with low-viscosity, low-dielectric constant linear carbonate, such as dimethyl carbonate and diethyl carbonate, in an appropriate ratio, a ring-type carbonate may be more preferably used.

A lithium salt may be used as the metal salt, and the lithium salt is a material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

One or more additive, for example, a haloalkylene carbonate-based compound, such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLES AND COMPARATIVE EXAMPLES

Preparation Example 1: Preparation of Silicon-Based Compound 20 g of SiO powder and 2 g of lithium metal powder were mixed and then put in a reaction vessel of a chamber, and subsequently, the temperature of the chamber was increased to 800° C. In this case, Ar was used as an inert gas. Thereafter, a heat treatment was performed for 2 hours, and the chamber temperature was then reduced to room temperature to collect a product in the reaction vessel. The collected product was acid-treated using HCl. Thereafter, the acid-treated product was milled to prepare a silicon-based compound having an average particle diameter ($D_{50}$) of 5 μm. As a result of X-ray diffraction (XRD) measurement, it was confirmed that the silicon-based compound included $Li_2Si_2O$ and $Li_2SiO_3$, as metal silicates, and lithium of the $Li_2Si_2O$ and $Li_2SiO_3$ was included in a total amount of 5 parts by weight based on 100 parts by weight of the silicon-based compound.

Example 1: Preparation of Negative Electrode Active Material (1) Polymer Layer Formation The silicon-based compound of Preparation Example 1 was added to a dimethylacetamide (DMAC) solution including poly(acrylic acid) (PAA), and stirred for 1 hour in a reducing atmosphere at room temperature. In this case, Ar gas was used to create the reducing atmosphere. Thereafter, the silicon-based compound was extracted by centrifugation, and a silicon-based compound having PAA coated on the surface thereof was then obtained by vacuum drying. Imidization of the silicon-based compound having PAA coated on the surface thereof was performed by a heat treatment at 300° C. for 60 minutes in a reducing atmosphere of Ar gas, and thus, a 1 μm thick polyimide layer was formed on the silicon-based compound. The thickness of the polyimide layer was measured by transmission electron microscopy.

(2) Formation of Metal Catalyst Layer

The silicon-based compound having the polyimide layer formed thereon was added to a potassium hydroxide (KOH) aqueous solution at 50° C. and then stirred for 10 minutes. Thereafter, the silicon-based compound was extracted by centrifugation. The extracted silicon-based compound was added to a nickel sulfate ($Ni_2SO_4$) aqueous solution, stirred for 10 minutes, and then rinsed. Thereafter, the silicon-based compound was added to a borohydride aqueous solution at 50° C. and then stirred for 30 minutes to prepare particles in which a 100 nm thick nickel catalyst layer was formed on the polyimide layer. The thickness of the catalyst layer was measured by transmission electron microscopy.

(3) Heat Treatment

The particles were put in a tube furnace and heat-treated at 600° C. for 10 minutes in a reducing atmosphere. This resulted in an amorphous carbon layer and a graphene layer disposed on the nickel catalyst layer and including a plurality of graphenes being formed from the polyimide layer. In this case, Ar gas was used for the reducing atmosphere. The amorphous carbon layer had a thickness of 300 nm, and the graphene layer had a thickness of 50 nm. The thicknesses of these layers were measured by transmission electron microscopy.

(4) Removal of Metal Catalyst Layer

The silicon-based compound having the amorphous carbon layer and the graphene layer formed on the surface thereof was added to 1M $FeCl_3$ aqueous solution to perform etching for 2 hours, and the silicon-based compound was then dried with ethanol to remove the nickel catalyst layer. At least one cavity corresponding to a separated space between the amorphous carbon layer and the graphene layer was formed between the amorphous carbon layer and the graphene layer while the nickel catalyst layer was removed. The at least one cavity had an average thickness ranging from 100 nm to 200 nm.

Example 2: Preparation of Negative Electrode Active Material

A negative electrode active material of Example 2 was prepared in the same manner as in Example 1 except that a nickel catalyst layer was formed to a thickness of 50 nm. In the prepared negative electrode active material, the amorphous carbon layer had a thickness of 150 nm, and the graphene layer had a thickness of 25 nm. Also, the at least one cavity had an average thickness in the range of 50 nm or more to less than 100 nm.

Comparative Example 1: Preparation of Negative Electrode Active Material (1) Amorphous Carbon Layer Formation 100 g of the silicon-based compound of Preparation Example 1 and 7 g of coal tar pitch were mixed and then heat-treated at 950° C. to prepare a negative electrode active material in which a 300 nm thick amorphous carbon layer was disposed on the surface of the silicon-based compound.

Comparative Example 2: Preparation of Negative Electrode Active Material (1) Amorphous Carbon Layer Formation 100 g of the silicon-based compound of Preparation Example 1 and 7 g of coal tar pitch were mixed and then heat-treated at 950° C. to form a 300 nm thick amorphous carbon layer on the surface of the silicon-based compound.

(2) Crystalline Carbon Layer Formation

The silicon-based compound having the amorphous carbon layer disposed thereon was put in a reaction vessel of a chamber, and a temperature of the chamber was increased to 950° C. In this case, a pressure in the chamber was maintained at 10 mTorr using a rotary pump. Thereafter, methane gas was injected for 5 minutes, and the temperature of the chamber was then reduced to room temperature. Thereafter, a product in the reaction vessel was collected and a crystalline carbon layer having a thickness of 50 nm was formed on the amorphous carbon layer. A cavity (e.g., separated space) was not present between the amorphous carbon layer and the crystalline carbon layer.

Comparative Example 3: Preparation of Negative Electrode Active Material (1) Amorphous Carbon Layer Formation 100 g of the silicon-based compound of Preparation Example 1 and 7 g of coal tar pitch were mixed and then heat-treated at 950° C. to form a 300 nm thick amorphous carbon layer on the surface of the silicon-based compound. The thickness was measured by transmission electron microscopy.

(2) Formation of Metal Catalyst Layer

The silicon-based compound having the amorphous carbon layer formed thereon was added to a potassium hydroxide (KOH) aqueous solution at 50° C. and then stirred for 10 minutes. Thereafter, the silicon-based compound was extracted by centrifugation. The extracted silicon-based compound was added to a nickel sulfate ($Ni_2SO_4$) aqueous solution, stirred for 10 minutes, and then rinsed. Thereafter, the silicon-based compound was added to a borohydride aqueous solution at 50° C. and then stirred for 30 minutes to prepare particles in which a 100 nm thick nickel catalyst layer was formed on the amorphous carbon layer. The thickness was measured by transmission electron microscopy.

(3) Formation of Graphene Layer

The silicon-based compound having the nickel catalyst layer and the amorphous carbon layer disposed on the surface thereof was put in a reaction vessel of a chamber, and a temperature of the chamber was increased to 950° C. In this case, a pressure in the chamber was maintained at 10 mTorr using a rotary pump. Thereafter, methane gas was injected for 5 minutes, and the temperature of the chamber was then reduced to room temperature. Thereafter, a product in the reaction vessel was collected and a graphene layer having a thickness of 50 nm was formed on the amorphous carbon layer. The thickness was measured by transmission electron microscopy. A cavity (e.g., separated space) was not present between the amorphous carbon layer and the graphene layer.

Examples 3 and 4 and Comparative Examples 4, 5, and 6: Preparation of Secondary Batteries Secondary batteries of Examples 3 and 4 and Comparative Examples 4, 5, and 6 were respectively prepared by using the negative electrode active materials of Examples 1 and 2 and Comparative Examples 1, 2, and 3.

Specifically, each of the negative electrode active materials of Examples 1 and 2 and Comparative Examples 1, 2, and 3, natural graphite, carbon black having an average particle diameter ($D_{50}$) of 65 nm, CMC, and a styrene-butadiene rubber (SBR) were added and mixed in a weight ratio of 9.6:86.2:1.0:1.7:1.5 with distilled water, as a solvent, to prepare a negative electrode slurry having a solid content of the mixture of 45%.

Separate 20 μm thick copper (Cu) thin film, as a negative electrode collector, were coated with each negative electrode mixture slurry at a loading amount of 160 mg/25 $cm^2$ and dried. In this case, a temperature of circulating air was 70° C. Subsequently, each negative electrode collector coated with the slurry and dried was roll-pressed and dried in a vacuum oven at 130° C. for 8 hours to prepare negative electrodes.

Each of the negative electrodes was cut into a circle of area 1.4875 cm$^2$, and Li-metal was used as a positive electrode. A porous polyethylene separator was disposed between the positive electrode and the negative electrode, and a coin-half-cell including one sheet of each of the Li-metal and the negative electrode was prepared by injecting an electrolyte solution in which 1 M LiPF$_6$ was dissolved in a mixed solution in which a mixing volume ratio of ethyl methyl carbonate (EMC) to ethylene carbonate (EC) was 7:3.

Test Example 1: Evaluation of Capacity Retention

Capacity retention of each of the secondary batteries of Examples 3 and 4 and Comparative Examples 4, 5, and 6 was evaluated by the following method, and the results thereof are presented in Table 1.

A first cycle was performed by charging at 0.1 C and discharging at 0.1 C, and charging at 0.5 C and discharging at 0.5 C were performed from a 2$^{nd}$ cycle to a 50$^{th}$ cycle.

Charge condition: CC (constant current)/CV (constant voltage) (5 mV/0.005 C current cut-off).

Discharge condition: CC (constant current) condition 1.0 V.

The capacity retention was derived by the following calculation.

Capacity retention(%)=(discharge capacity in the 50$^{th}$ cycle/discharge capacity at 1.0 V in the first cycle)×100

TABLE 1

| | Example 3 | Example 4 | Comparative Example 4 | Comparative Example 5 | Comparative Example 6 |
|---|---|---|---|---|---|
| Capacity retention | 96 | 91 | 75 | 85 | 87 |

Referring to Table 1, with respect to the batteries of Examples 3 and 4 in which the negative electrode active materials prepared according to the preparation method of the present invention were used, the capacity retentions were significantly higher than that of the battery of Comparative Example 4 in which the negative electrode active material without graphene was used. Also, it was confirmed that the batteries of Examples 3 and 4 also had higher capacity retentions than the batteries of Comparative Examples 5 and 6 which included the negative electrode active materials prepared by a general method in which the amorphous carbon layer and the crystalline carbon layer (or graphene layer) were sequentially formed. The reason for this is that, with respect to the negative electrode active materials of Examples 1 and 2, the at least one cavity played a role in suppressing structural collapse of the negative electrode active material and maintaining a conductive path.

The invention claimed is:

1. A negative electrode active material particle comprising:
   a silicon-based compound comprising SiO$_x$, wherein 0.5<x<1.3;
   an amorphous carbon layer disposed on the silicon-based compound;
   a graphene layer disposed on the amorphous carbon layer; and
   at least one cavity present on at least a portion of a surface of the amorphous carbon layer and positioned between the amorphous carbon layer and the graphene layer,
   wherein the graphene layer has a thickness of 0.5 nm to 200 nm,
   wherein the silicon-based compound has an average particle diameter (D50) in a range of 5 μm to 20 μm, and
   wherein an outer surface of the graphene layer is spherical.

2. The negative electrode active material particle of claim 1, wherein the at least one cavity is two or more cavities which are present and scattered on the surface of the amorphous carbon layer.

3. The negative electrode active material particle of claim 1, wherein the at least one cavity has an average thickness of 0.5 nm to 200 nm.

4. The negative electrode active material particle of claim 1, wherein the amorphous carbon layer has a thickness of 0.001 μm to 10 μm.

5. A negative electrode comprising the negative electrode active material particle of claim 1.

6. The negative electrode of claim 5, further comprising graphite-based particles.

7. A secondary battery comprising:
   the negative electrode of claim 5;
   a positive electrode;
   a separator disposed between the positive electrode and the negative electrode; and
   an electrolyte.

8. The negative electrode active material particle of claim 1, wherein the at least one cavity is formed by the removal of a nickel catalyst layer present between the amorphous carbon layer and the graphene layer.

9. The negative electrode active material particle of claim 1, wherein the at least one cavity has an average thickness of 100 nm to 200 nm.

* * * * *